United States Patent
Russell et al.

(10) Patent No.: US 9,141,451 B2
(45) Date of Patent: Sep. 22, 2015

(54) MEMORY HAVING IMPROVED RELIABILITY FOR CERTAIN DATA TYPES

(71) Applicants: Andrew C. Russell, Austin, TX (US); Ravindraraj Ramaraju, Round Rock, TX (US)

(72) Inventors: Andrew C. Russell, Austin, TX (US); Ravindraraj Ramaraju, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 209 days.

(21) Appl. No.: 13/736,310

(22) Filed: Jan. 8, 2013

(65) Prior Publication Data

US 2014/0195729 A1    Jul. 10, 2014

(51) Int. Cl.
G06F 11/00 (2006.01)
G06F 11/10 (2006.01)
G06F 11/07 (2006.01)
G06F 12/08 (2006.01)

(52) U.S. Cl.
CPC ............ *G06F 11/004* (2013.01); *G06F 11/073* (2013.01); *G06F 11/1064* (2013.01); *G06F 12/0846* (2013.01)

(58) Field of Classification Search
CPC ... G06F 12/00; G06F 11/073; G06F 11/1064; G06F 12/0846; G06F 11/002; G06F 11/106; G06F 11/004; G06F 1/3203
See application file for complete search history.

(56) References Cited

U.S. PATENT DOCUMENTS

| | | | |
|---|---|---|---|
| 5,303,190 | A | 4/1994 | Pelley, III |
| 6,766,431 | B1 | 7/2004 | Moyer |
| 6,772,383 | B1 * | 8/2004 | Quach et al. ............. 714/746 |
| 7,100,004 | B2 | 8/2006 | Chen Johnson et al. |
| 7,434,012 | B1 | 10/2008 | Ives et al. |
| 7,437,597 | B1 | 10/2008 | Kruckemyer et al. |
| 7,564,093 | B2 * | 7/2009 | Matsuda .................. 257/315 |
| 7,606,980 | B2 | 10/2009 | Qureshi et al. |
| 7,716,428 | B2 * | 5/2010 | Guthrie et al. ............ 711/141 |
| 7,882,323 | B2 | 2/2011 | Allison et al. |
| 8,024,638 | B2 | 9/2011 | Resnick et al. |
| 2003/0191888 | A1 * | 10/2003 | Klein ....................... 711/105 |
| 2004/0243886 | A1 | 12/2004 | Klein |
| 2007/0011513 | A1 | 1/2007 | Biswas et al. |
| 2009/0144503 | A1 * | 6/2009 | Faucher et al. ........... 711/128 |
| 2010/0176841 | A1 * | 7/2010 | Jang et al. ................ 326/13 |
| 2010/0191990 | A1 * | 7/2010 | Zhang et al. ............. 713/320 |

OTHER PUBLICATIONS

Tezzaron Semiconductor, Soft Errors in Electronic Memory—A White Paper, Version 1.1, Jan. 5, 2004.*
S. Jahinuzzaman et al., A Soft Error Tolerant 10T SRAM Bit-Cell With Differential Read Capability, IEEE Transactions on Nuclear Science, vol. 56, No. 6, Dec. 2009.*
F. Ootsuka et al., "A novel 0.25 full CMOS SRAM cell using stacked cross couple with enhanced soft error immunity," in Proc. Int. Electron Devices Meeting, 1998, pp. 205-208.*

(Continued)

*Primary Examiner* — Cheng-Yuan Tseng
*Assistant Examiner* — Francisco Grullon
(74) *Attorney, Agent, or Firm* — Terrile, Cannatti, Chambers & Holland, LLP; Stephen A. Terrile

(57) ABSTRACT

A method for minimizing soft error rates within caches by configuring a cache with certain sections to correspond to bitcell topologies that are more resistant to soft errors and then using these sections to store modified data.

19 Claims, 5 Drawing Sheets

(56) References Cited

OTHER PUBLICATIONS

J. Barth et al., A 45nm SOI Embedded DRAM Macro for POWER7(TM) 530319032MB On-Chip L3 Cache, IEEE International Solid-State Circuits Conference, Session 19, High-Performance Embedded Memory 19.1, 2010.

IBM Techdocs FAQ: Power 6 Frequently Asked Question, What is Hardware Assisted Memory Scrubbing and how is it used?, printed Jul. 13, 2012.

Wikipedia.org, Error detection and correction, Error-correcting code, printed Jul. 13, 2012.

Wikipedia.org, Memory scrubbing, printed Jul. 13, 2012.

K. Flautner et al., Drowsy Caches: Simple Techniques for Reducing Leakage Power, 29th Annual International Symposium on Computer Architecture, 2002.

S. Jahinuzzaman et al., IEEE Transactions on Nuclear Science, vol. 56, No. 6, Dec. 2009.

R. Naseer et al., The DF-Dice Storage Element for Immunity to Soft Errors, 48th Midwest Symposium on Circuits and Systems, Aug. 7-10, 2005 pp. 303-306.

* cited by examiner

MEMORY HAVING IMPROVED RELIABILITY FOR CERTAIN DATA TYPES

CROSS-REFERENCE TO RELATED APPLICATION

U.S. patent application Ser. No. 13/588,194, entitled "Memory Scrubbing Rate Based on Data Type" by inventors Ravindraraj Ramaraju, William C. Moyer, and Andrew C. Russell, filed on Aug. 17, 2012, describes exemplary methods and systems and is incorporated by reference in its entirety.

U.S. patent application Ser. No. 13/588,243, entitled "Data Type Dependent Memory Scrubbing" by inventors Ravindraraj Ramaraju, William C. Moyer, and Andrew C. Russell, filed on Aug. 17, 2012, describes exemplary methods and systems and is incorporated by reference in its entirety.

U.S. patent application Ser. No. 13/736,322, entitled "Memory Using Voltage to Improve Reliability for Certain Data Types" by inventors Andrew Russell and Ravindraraj Ramaraju, filed on Jan. 8, 2013, describes exemplary methods and systems and is incorporated by reference in its entirety.

BACKGROUND OF THE INVENTION

1. Field of the Invention

The present invention relates in general to the field of improving the error resilience of memories.

2. Description of the Related Art

In general, data processing systems comprise a processor (often referred to as a central processing unit (CPU)) that executes instructions that are fetched from a main memory. One method to improve the performance of the processor is to use cache memory. Cache memory is high speed memory that works with the processor and the main memory to quickly provide information (e.g., instructions and/or data) to the processor. By using a cache architecture, a faster response time is possible than when the processor fetches all information directly from the main memory. The improved performance is possible because the cache usually contains the information that the processor is likely to request from memory. The cache is typically faster than the main memory; therefore, the cache can usually provide the data required by the processor much faster than the main memory. Part of the methodology used to load information into the cache is to predict and store the information that is frequently used by the processor and is likely to be used by the processor.

When the cache contains information requested by the processor, this is referred to as a cache hit. If the cache does not contain the information requested by the processor, then this is referred to as a cache miss. On a miss, the information is loaded from the main memory into the cache and is also provided to the processor. The information is loaded into the cache in anticipation that the processor will request the data in an upcoming bus cycle. This process continues throughout the operation of the data processing system.

Caches typically include a cache tag array and a cache data array. Each array is organized into a number of cache lines. Each cache line includes a tag portion (contained in the cache tag array) and a data portion (contained in the cache data array). The tag value in a line is compared with the address of a memory request from the processor to determine whether the requested data is present in the data portion of that cache line. Validity information is associated with each cache line to indicate whether the line contains currently valid information and whether the information conforms to the information stored within the main memory (referred to as cache coherency). Additionally, for caches which can operate in a copyback or writeback mode, additional status information is retained to indicate whether the cache line is modified (dirty) relative to the value stored in main memory. One example of a protocol for cache coherency is the modified, exclusive, shared, invalid (MESI) protocol.

One issue relating to caches is that with the scaling of technology and power supply, the bitcells are often more sensitive to soft errors. Another issue relating to caches is that to reduce the standby leakage power, the cache memories are often retained in a low power state during an inactive state. This low power state is known to contribute towards increasing the soft error rate (SER). Another issue relating to caches is that because modified data is not stored anywhere else within the data processing system, it is particularly desirable to protect this modified data against loss such as loss due to soft errors within the cache because the loss would be unrecoverable.

BRIEF DESCRIPTION OF THE DRAWINGS

The present invention is illustrated by way of example and not limitation in the accompanying figures, in which like references indicate similar elements, and in which.

DETAILED DESCRIPTION

In general embodiments of the present invention, a method for minimizing soft error rates within caches by configuring a cache with certain sections with bitcell topologies that are more resistant to soft errors and then using these sections to store modified data is set forth.

In certain embodiments, the cache is partitioned into memory locations which are configured with bitcell topologies that are more soft error resistant and memory location which are configured with bitcell topologies that are less soft error resistant. More specifically, in certain embodiments, the memory is partitioned by way because a particular address maps to a set in the cache and the cache controller may select which of the ways in the set to write the data value. Therefore one of the ways in the cache is configured with a bitcell topology to be more resistant to soft errors compared to another way in the cache using a different bitcell topology. When modified data is to be written to the cache, the cache controller selects to write the modified data to the more resistant way. When unmodified data is to be written to the cache, the cache controller can select either the more or less resistant ways to write the data. By providing only certain ways as more resistant, any additional bitcell area expended in improving soft error resistance is limited to only the more resistant ways. Unmodified data can be stored within a less soft error resistant bitcell topology. In certain embodiments, the ways that are more resistant to soft errors are configured using DRAM type cells whereas the way or ways that are less resistant to soft errors are configured using SRAM type cells. In certain other embodiments, the ways that are more resistant to soft errors are configured using more transistors (e.g., ten transistor (10T) or twelve transistor (12T) type cells) whereas the way or ways that are less resistant to soft errors are configured using fewer transistors (e.g., six transistor (6T) type cells). Additionally, in certain embodiments, the ways that are more resistant to soft errors are configured using a dual interlocked cell (DICE) topology whereas the ways that are less resistant to soft errors are configured using a conventional cell topology (e.g., a six transistor (6T) cell topology).

Figure 1:
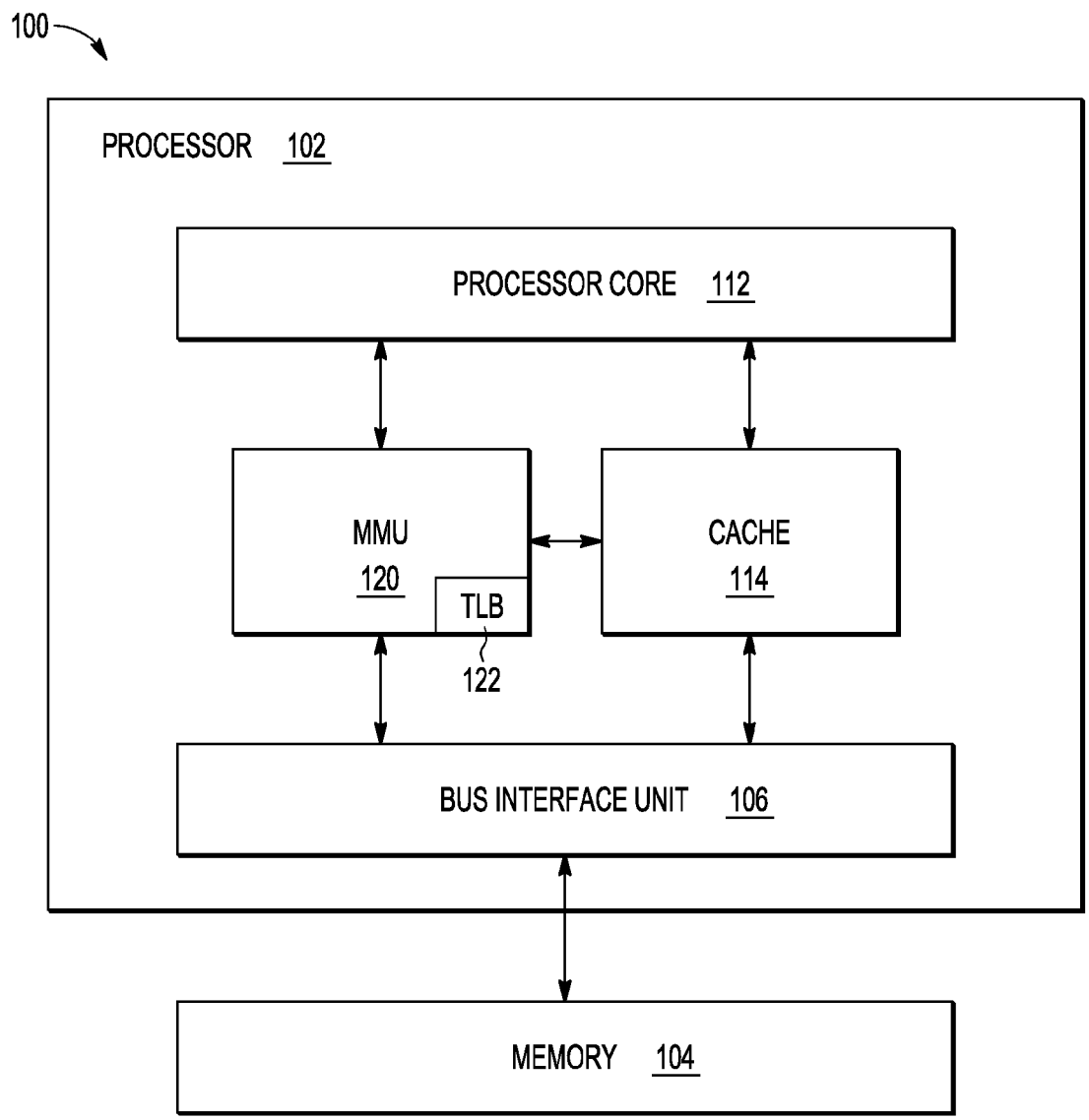
FIG. 1 shows a block diagram of a data processing system.

Referring to FIG. 1, a block diagram of a data processing system 100 is shown. The data processing system includes a processor 102 as well as a memory 104 and a bus interface unit 106. The processor 102 includes at least one processor core 112 as well as a cache system 114. It will be appreciated that while the data processing system 100 shows a single unified cache, separate instruction and data caches are contemplated. The processor 102 is coupled to the memory 104 via the bus interface unit 106. The memory 104 and the cache system 114 are managed by a memory management unit (MMU) 120. The MMU 120 includes a translation lookaside buffer (TLB) 122. The memory 104 includes one or more memory devices. The components of the data processing system 100 are coupled together by various buses used to pass control, address, and data signals.

Figure 2:
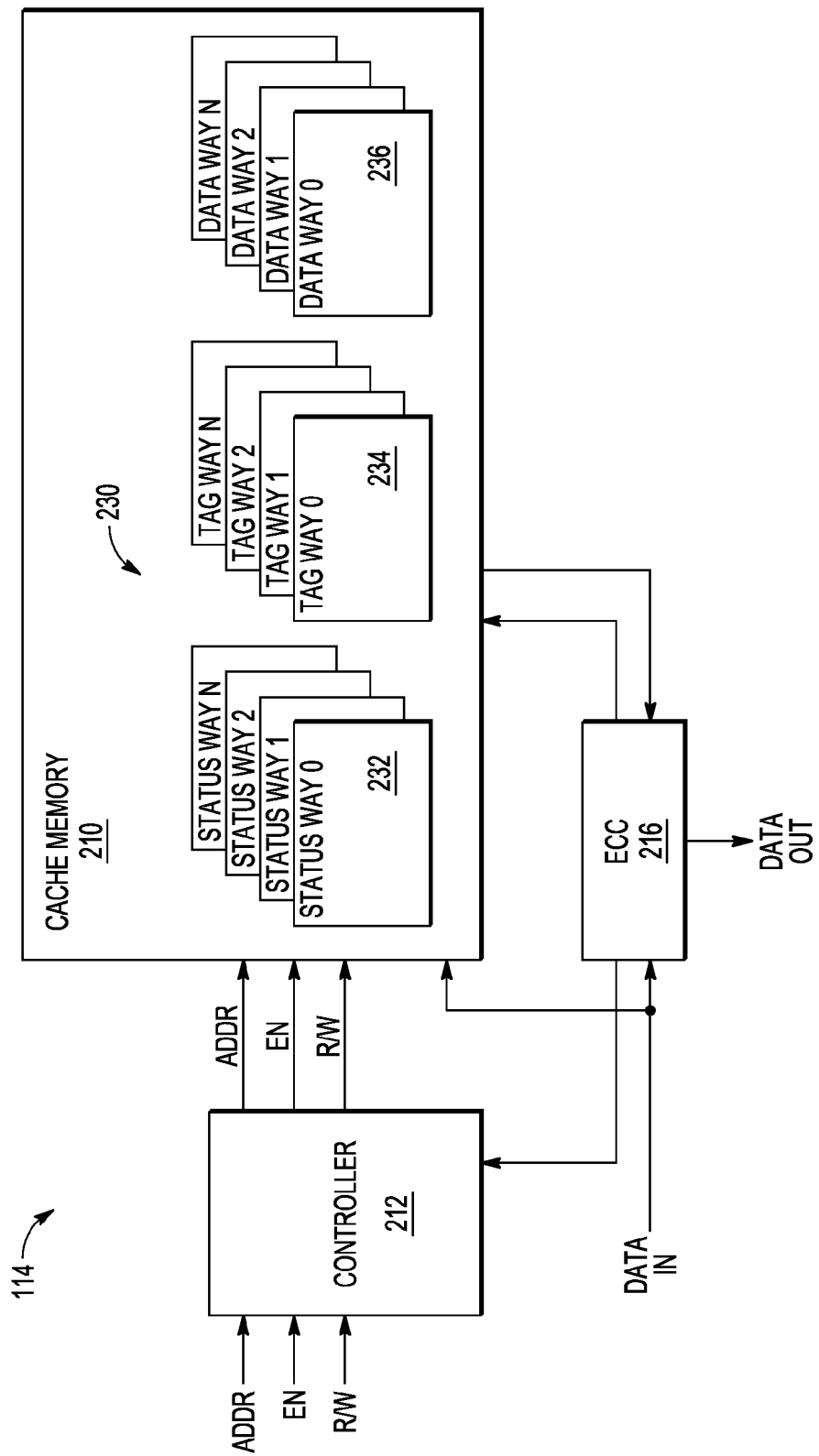
FIG. 2 shows a block diagram of a cache system.

Referring to FIG. 2, a block diagram of a cache system 114 is shown. The cache system 114 includes a cache memory 210 as well as a controller 212 and error correction code (ECC) logic 216.

The controller 212 receives an address signal (ADDR), an enable signal (EN) and a read/write signal (R/W) and provides the address signal, the enable signal and the read/write signal to the cache memory 210. In certain embodiments, the controller 212 operates in accordance with a cache coherency protocol such as the MESI cache coherency protocol.

The ECC logic 216 provides and receives information from the cache memory 210. The ECC logic 216 also provides error information to the controller 212. More specifically, the ECC logic 216 receives a data input (e.g., an n-bit wide data input) from the data processing system 100 and generates a correction code based upon the data input (e.g., a k-bit wide correction code). The data input and the corresponding correction code are both provided to and stored within the cache memory 210 (e.g., an n+k bit wide input). The ECC logic 216 also receives data and correction code information from the cache memory 210 (e.g., an n+k bit wide data output) and generates a data output (e.g., an n-bit wide data output) after confirming that the data is correct based upon the correction code information. In certain embodiments, the ECC logic 216 uses a hamming code to provide single error correction and double error detection (SEC-DED).

The cache memory 210 includes a plurality of cache ways (also referred to as banks) 230 (WAY 0, WAY 1, WAY 2, WAY N). Each way 230 includes a plurality of cache lines. In certain embodiments, the cache ways 230 further include a plurality of status ways 232, a plurality of tag ways 234, and a plurality of data ways 236. The combination of the information from a line of the status ways 232, a line of the tag ways 234, and the data ways 236, provides a cache line. It will be appreciated that these ways may be separate or combined as a matter of design choice. In certain embodiments, the status ways store information used by the controller 212 to perform the MESI cache coherency protocol.

In general, when the processor core 112 makes a memory access request, the MMU 120 translates the virtual address of the request, via the TLB 122, and determines the corresponding physical address for the access. Note that some address requests contain the physical address directly, and do not require translation. The cache system 114 then determines whether the information requested by the processor core 112 is present in cache memory 210 by comparing address information in the request to tag information in the tag array 234. If the requested information is determined to be present in cache memory 210, the information read from the data array 236 is provided to the processor core 112. If the requested information is not present in the cache memory 210, the data processing system 100 accesses the memory 104 using the physical address determined via the TLB 122. The requested information is stored within the cache system 114 and is also provided to the processor core 112.

Figure 3:
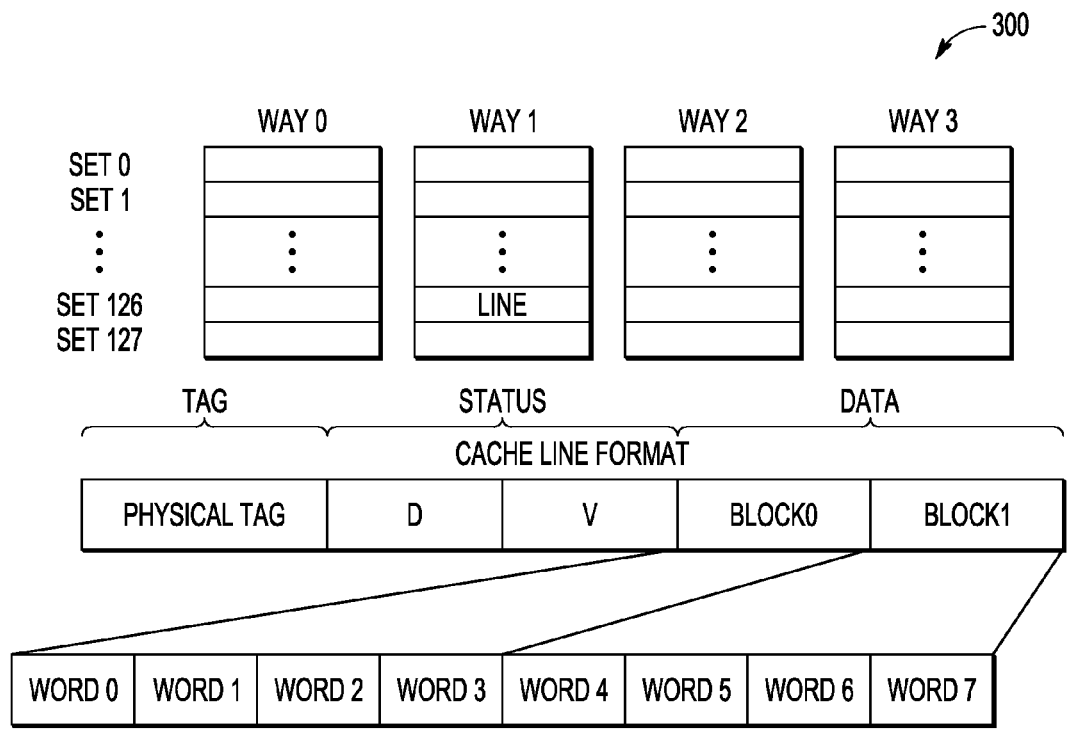
FIG. 3 shows a block a diagram of the organization of a 4-way associative cache.

Referring to FIG. 3, a block diagram showing the organization of a 4-way associative cache 300 used in one embodiment of the present invention is shown. Note that the invention is not limited to this organization or to associative caches. FIG. 3 shows a cache having 4 ways (WAY 0, WAY 1, WAY 2, and WAY 3), each having 128 sets (SET 0, SET 1, ... SET 126, and SET 127). For each set, there are 4 cache lines, one corresponding to each way. Each cache line includes a plurality of blocks and each block includes at least one word location. Each line includes two blocks (BLOCK0, BLOCK1), each containing four words. Any data stored in the cache system 114 is contained in one of the blocks. The ways are configured so that at least one of the ways is more resistant to soft errors than the other ways.

Each line also includes an address tag (TAG) which corresponds to the address of the data contained in the blocks. Each line also includes a valid bit V which signifies whether or not the cache blocks BLOCK0 and BLOCK1, contain valid information. Each line also includes a dirty bit D which is set to "1" when the data contained in the line has been modified by the processor (i.e., the line contains modified data) and is therefore not consistent with the information in the corresponding physical memory location. If the data in a line is "dirty," the modified data is eventually written to the physical memory location. This process is referred to as "copy-back."

The controller 212 of the cache system 114 controls the placement and storage of information within the cache such that modified information is stored within a single way (e.g., WAY 0), or a subset of ways (e.g., WAYS 0 and 1) that are more soft error resistant. The cache controller 212 controls this placement based upon the state of the dirty bit of the cache line. In this manner, the controller 212 can dynamically choose the ways 230 of the cache system 114 so that the way or subset of ways in which modified data are stored are more resistant to errors. Additionally, if data is read from one way and then modified, the modified data is stored to the more soft error resistant way. In this case, the location from which the data was read is invalidated so that it may be used again for unmodified data.

The controller 212 maintains a predetermined sequence and process of storing all modified information of the data processing system 100 in a subset of ways 230 of the cache system 114. The controller 212 controls the subset of the ways of the tag and/or data arrays of the cache with the modified information to be more error resistant compared to the rest of the ways of the tag and/or data arrays with clean information (i.e., information where the information stored within the main memory is coherent with the information stored within the cache). Because there is an additional location of the clean information (e.g., the clean information is also stored within memory 104), if a single event upset (SEU) error event occurs in a way containing clean information, the error can be detected and correct data can be reloaded from the memory 104. Ways containing potentially modified data are configured with a bitcell topology that is more resistant to soft errors to minimize the chances of multiple SEUs causing an uncorrectable error which cannot be recovered.

Figure 4:
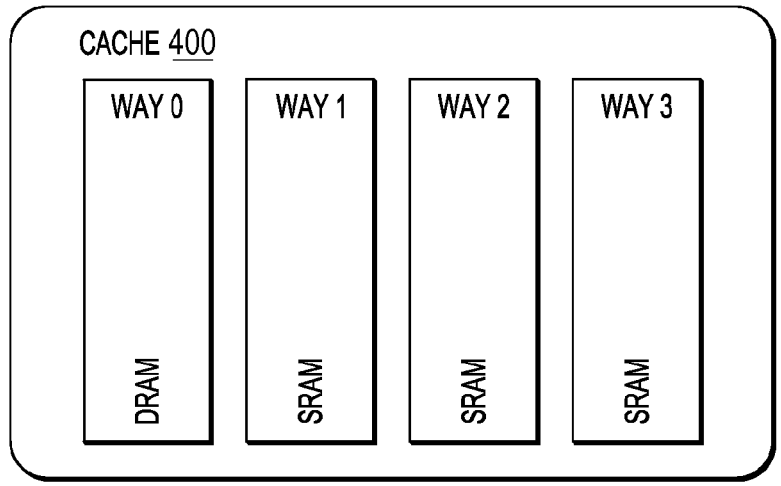
FIG. 4 shows a block diagram of an exemplative cache architecture.

Referring to FIG. 4, in one cache configuration 400, the ways that are more resistant to soft errors are configured using DRAM type cells whereas the way or ways that are less resistant to soft errors are configured using SRAM type cells. DRAM cells are less susceptible to soft errors (and thus are more resistant) than SRAM cells. Modified data is only stored within Way 0 as this is the Way that is more resistant to soft errors. If Way 0 is full when storing modified data (even if the other ways are not), then a replacement algorithm is used to evict data to make room for new modified data. Unmodified data is stored within any of the ways (Way 0-Way 3).

With both DRAM type cells and SRAM type cells, an integrated circuit (or portion thereof) is etched in an array of columns (bitlines) and rows (wordlines). The intersection of a bitline and wordline provides an address of the memory cell.

A DRAM cell typically includes a single pass transistor for accessing the cell and a capacitor for storing cell state in the form of a charge level. To access a DRAM cell, a voltage is applied to the appropriate row to activate the DRAM cell pass transistor so that the DRAM cell capacitor is coupled to its associated bitline. When writing, the bitline voltage level determines a state the cell capacitor should take. When reading, a sense-amplifier coupled to the bitline of the cell being read determines a level of charge in the DRAM cell capacitor. If the level of charge is more than 50 percent, then the sense-amplifier reads the stored value as a 1; otherwise the sense-amplifier reads the stored value as a 0. A counter tracks a refresh sequence based on which rows have been accessed and in what order. Because charge leaks off the DRAM cell capacitor, DRAM cells must be periodically refreshed to maintain the necessary level of charge within each address location.

With SRAM type cells, bistable latching circuitry is used to store each bit. SRAM type cells do not need to be periodically refreshed because the cell state is actively maintained by cross coupled inverters within the cell. DRAM type cells have a plurality of characteristics which make the DRAM type cells more resistant to soft errors. For example, DRAM type cells generally have a larger transcapacitance across the transistors within each bitcell. Additionally, DRAM type cells generally use a smaller junction area within an integrated circuit than SRAM type cells. Having a smaller junction area reduces the potential of particle induced single event transients from causing a soft error.

Figure 5:
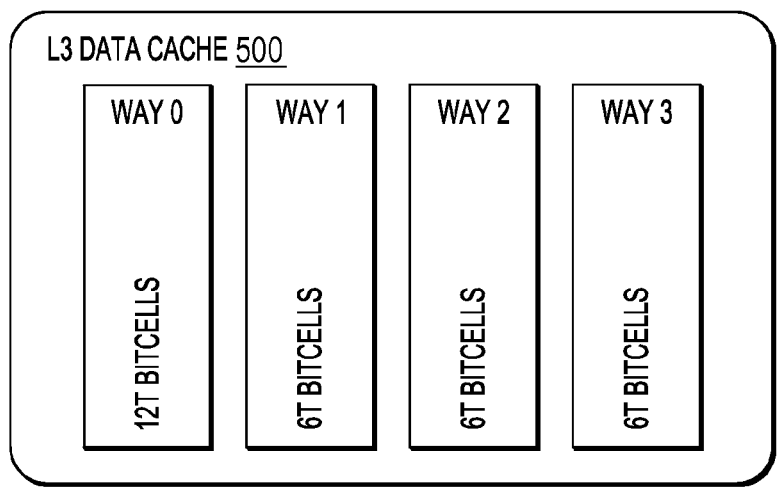
FIG. 5 shows a block diagram of another exemplative cache architecture.

Referring to FIG. 5, in another cache configuration 500, the ways that are more resistant to soft errors are configured using a twelve transistor (12T) type bitcell topology whereas the way or ways that are less resistant to soft errors are configured using a six transistor (6T) type bitcell topology. Twelve transistor cells are less susceptible to soft errors (and thus are more resistant) than six transistor cells. Modified data is only stored within Way 0 as this is the Way that is more resistant to soft errors. If Way 0 is full when storing modified data (even if the other ways are not), then a replacement algorithm is used to evict old modified data to make room for new modified data. Unmodified data is stored within any of the ways (Way 0-Way 3).

Generally, the fewer transistors needed per cell, the smaller each cell can be. Because the cost of processing a silicon wafer is relatively fixed, using smaller cells and so packing more bits on one wafer reduces the cost per bit of memory. Accordingly, using the smaller 6T type cells for sections of the memory in which unmodified data is stored reduces the overall size of the memory.

Additionally, in certain embodiments, the ways that are more resistant to soft errors are configured using a DICE bitcell topology whereas the ways that are less resistant to soft errors are configured using conventional bitcell topology such as a cross coupled inverter bitcell topology (e.g., a six transistor (6T) cell topology where four transistors are cross coupled to provide two cross coupled inverters). In some embodiments, each bitcell which is configured to conform to a DICE topology generally includes transistors configured to provide four interlocked inverters whereas each bitcell which is configured to conform to a conventional (i.e., an interlocked inverter) bitcell topology generally includes transistors configured to provide two interlocked inverters. The data storage node redundancy provided by the four interlocked inverters of the DICE bitcell topology provides increased soft error resistance compared to the conventional bitcell topology. Jahinuzzaman et at., *A Soft Error Tolerant 10T SRAM Bit-Cell With Differential Read Capability*, provides examples of a plurality of bitcell topologies (including a DICE bitcell topology) having more and less soft error resistance.

Figure 6:
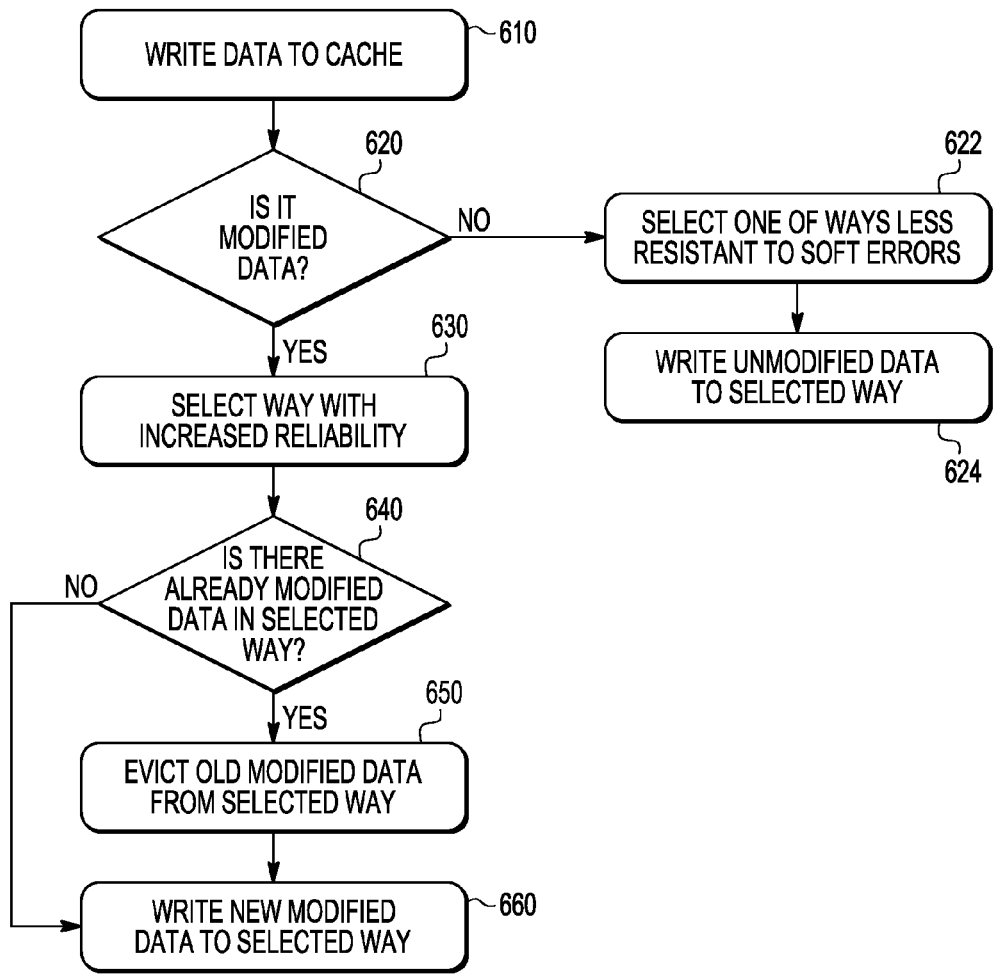
FIG. 6 shows a flow chart of the operation of a system for minimizing soft error rates within caches.

Referring to FIG. 6, a flow chart of the operation of a system for minimizing soft error rates within caches is shown. More specifically, the operation starts with the initiation of a data write operation to the cache at step 610. Next, the cache control logic 212 determines whether the data to be written is modified at step 620. If not, then the cache control 212 selects one of the ways that are less resistant to soft errors at step 622 and writes the unmodified data to the selected way at step 624.

If the data is modified as determined by step 620 then the cache control logic 212 selects the way with the increased reliability at step 630. Next, the cache control logic 212 determines whether the selected way contains valid modified data at step 640. If yes, then at step 650 the cache control logic 212 evicts the old modified data (i.e., valid modified data) from the selected way and writes the new modified data to the selected way at step 660. If no, then the cache control logic 212 proceeds to write the modified data in the selected way at step 660.

Various illustrative embodiments have been described in detail with reference to the accompanying figures. While various details are set forth in the description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, to avoid limiting or obscuring the present invention. Also for example, while the data processing system is shown with a processor having a particular architecture with a single core, other processor architectures are contemplated, including multicore type processor architectures. Also for example, various types of cache storage units such as ways, banks, way unit blocks and groups of bitcells may each be considered to be sections within the cache.

For example, in certain embodiments, more than one way may be designed to be more resistant to soft errors. In certain embodiments, the number of ways that are designed to be more resistant to soft errors may be adjusted based upon usage and replacement considerations of the cache.

Consequently, the invention is intended to be limited only by the spirit and scope of the appended claims, giving full cognizance to equivalents in all respects.

What is claimed is:

1. A cache system comprising:
a cache array, the cache array comprising a plurality of sections, at least one of the sections comprising bitcells configured with an error resistant bitcell topology and at least another of the sections comprising bitcells configured with a less error resistant bitcell topology, the error resistant bitcell topology being more resistant to soft errors than the less error resistant bitcell topology; and,
cache control logic, the cache control logic determining whether information to be written to the cache array comprises modified information, the cache control logic storing the modified information to the at least one of the sections comprising the cells configured with the error resistant bitcell topology; and wherein
the error resistant bitcell topology comprises bitcells with a first plurality of transistors; and
the less error resistant bitcell topology comprises bitcells with a second plurality of transistors, the second plurality of transistors being less than the first plurality of transistors.

2. The cache system of claim 1 wherein:
the cache control logic determines whether the section configured with the error resistant bitcell topology contains valid modified information and if so, the cache control logic evicts the valid modified information from the section configured with the error resistant bitcell topology and writes the modified information to the section configured with the error resistant bitcell topology.

3. The cache system of claim 2 wherein:
the cache control logic stores unmodified information to the at least one other of the sections.

4. The cache system of claim 1 wherein:
the error resistant bitcell topology comprises bitcells with a dynamic random access memory (DRAM) type bitcell topology; and,
the less error resistant bitcell topology comprises bitcells with a static random access memory (SRAM) type bitcell topology.

5. The cache system of claim 1 wherein:
the first plurality of transistors corresponds to a twelve transistor configuration and the second plurality of transistors corresponds to a six transistor configuration.

6. The cache system of claim 1 wherein:
the first plurality of transistors corresponds to a dual interlocked cell (DICE) configuration and the second plurality of transistors corresponds a cross coupled inverter cell configuration.

7. The cache system of claim 1 wherein:
each of the sections are characterized as ways.

8. A method for improving error resilience comprising:
providing a cache array, the cache array comprising a plurality of sections, at least one of the sections comprising bitcells configured with an error resistant bitcell topology at least another of the sections comprising bitcells configured with a less error resistant bitcell topology, the error resistant bitcell topology being more resistant to soft errors than the less error resistant bitcell topology;
determining whether data to be written to the cache array comprises modified information; and,
storing the modified information to the at least one of the sections configured via the error resistant bitcell topology; and wherein
the error resistant bitcell topology comprises bitcells with a first plurality of transistors; and the less error resistant bitcell topology comprises bitcells with a second plurality of transistors, the second plurality of transistors being less than the first plurality of transistors.

9. The method of claim 8 further comprising:
determining whether the section configured with the error resistant bitcell topology contains valid modified information and if so, evicting the valid modified information from the section configured with the error resistant bitcell topology and writing the modified information to the section configured with the error resistant bitcell topology.

10. The method of claim 8 further comprising:
storing unmodified information to the at least one other of the sections.

11. The method of claim 8 further comprising:
the error resistant bitcell topology comprises bitcells with a dynamic random access memory (DRAM) type bitcell topology; and,
the less error resistant bitcell topology comprises bitcells with a static random access memory (SRAM) type bitcell topology.

12. The method of claim 8 wherein:
the first plurality of transistors corresponds to a twelve transistor configuration and the second plurality of transistors corresponds to a six transistor configuration.

13. The method of claim 8 wherein:
the first plurality of transistors corresponds to a dual interlocked cell (DICE) configuration and the second plurality of transistors corresponds to a cross coupled inverter cell configuration.

14. The method of claim 8 wherein:
each of the sections are characterized as ways.

15. A memory comprising:
a first plurality of bitcells and a second plurality of bitcells, the first plurality of bitcells comprising bitcells having an error resistant topology and the second plurality of bitcells comprising bitcells having to another topology, the error resistant topology being more resistant to soft errors than the another topology;
a controller, the controller storing modified data only in the first plurality of bitcells; and wherein
each bitcell of the first plurality of bitcells has a first plurality of transistors; and,
each bitcell of the second plurality of bitcells has a second plurality of transistors, the second plurality of transistors being less than the first plurality of transistors.

16. The memory of claim 15 wherein:
the error resistant topology is characterized as a dynamic random access memory (DRAM) type topology; and,
the another topology is characterized as a static random access memory (SRAM) type topology.

17. The memory of claim 15 wherein:
each bitcell of the first plurality of bitcells is characterized as a dual interlocked cell (DICE) configuration; and,
each bitcell of the second plurality of bitcells is characterized as a conventional cell topology.

18. The memory of claim 15 wherein:
each bitcell of the first plurality of bitcells is characterized as a dynamic random access memory (DRAM) type bitcell topology; and,
each bitcell of the second plurality of bitcells is characterized as a static random access memory (SRAM) type bitcell topology.

19. The memory of claim 15 wherein:
the memory is characterized as a cache memory.

* * * * *